United States Patent
Sasaki

(10) Patent No.: US 12,525,883 B2
(45) Date of Patent: Jan. 13, 2026

(54) DC HIGH-VOLTAGE SOURCE DEVICE INCLUDING PLURALITY OF VARIABLE DC VOLTAGE SOURCES AND PLURALITY OF SWITCHING CIRCUITS, AND CHARGED PARTICLE BEAM DEVICE INCLUDING THE DC HIGH-VOLTAGE SOURCE DEVICE

(71) Applicant: Hitachi High-Tech Corporation, Tokyo (JP)

(72) Inventor: Tomoyo Sasaki, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 514 days.

(21) Appl. No.: 18/016,989

(22) PCT Filed: Jul. 22, 2020

(86) PCT No.: PCT/JP2020/028562
§ 371 (c)(1),
(2) Date: Jan. 19, 2023

(87) PCT Pub. No.: WO2022/018873
PCT Pub. Date: Jan. 27, 2022

(65) Prior Publication Data
US 2023/0353056 A1    Nov. 2, 2023

(51) Int. Cl.
*H02M 1/00*    (2007.01)
*H01J 37/248*    (2006.01)
(Continued)

(52) U.S. Cl.
CPC ............. *H02M 3/28* (2013.01); *H01J 37/248* (2013.01); *H02M 1/0043* (2021.05); *H02M 1/14* (2013.01)

(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS 3,484,866 A * 12/1969 Kawai ................... H02M 7/103
363/45
3,628,125 A * 12/1971 Dedieu ................. H02M 7/103
363/59

(Continued)

FOREIGN PATENT DOCUMENTS

EP    2077700 A1 *  7/2009  .............. H05G 1/26
JP    63-153788 U    10/1988
(Continued)

OTHER PUBLICATIONS

Luke et al., Title: "13.56 MHz high voltage multi-level voltage multi-level Resonant DC-DC converter", 2015 IEEE 16th Workshop on Control and Modelling for Power Electronics (COMPEL) 24(3):408-416 (2015) (Year: 2015).*

(Continued)

*Primary Examiner* — Jue Zhang
*Assistant Examiner* — Nusrat Quddus
(74) *Attorney, Agent, or Firm* — Crowell & Moring LLP

(57) ABSTRACT

A DC high-voltage source device includes a first voltage source including first and second variable DC voltage sources; first and second switching circuits that generate an AC voltage from the DC voltage of the first and second variable DC voltage sources, respectively; a first transformer that transforms the AC voltage generated by the first switching circuit; a second transformer that transforms the AC voltage generated by the second switching circuit; a DC high-voltage generation circuit that generates a DC high voltage based on a transformed AC voltage supplied from
(Continued)

the first transformer and a transformed AC voltage supplied from the second transformer. A computer system independently adjusts the DC voltage value of the first variable DC voltage source, the DC voltage value of the second variable DC voltage source, the switching timing of the first switching circuit, and the switching timing of the second switching circuit.

16 Claims, 9 Drawing Sheets

(51) Int. Cl.
*H02M 1/14* (2006.01)
*H02M 3/28* (2006.01)

(58) Field of Classification Search
CPC ...... H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; H02M 7/05; H02M 7/10; H02M 1/0064; H02M 1/0083; H02M 3/33573; H02M 3/33532; Y02B 70/1491
See application file for complete search history.

(56) References Cited

U.S. PATENT DOCUMENTS

| | | | | |
|---|---|---|---|---|
| 3,731,145 | A * | 5/1973 | Senay | H02M 7/10 239/708 |
| 4,050,005 | A * | 9/1977 | Maginness | H02M 7/103 363/59 |
| 4,279,010 | A * | 7/1981 | Morihisa | H02M 3/07 363/60 |
| 4,745,520 | A * | 5/1988 | Hughey | B05B 5/10 361/228 |
| 4,893,227 | A * | 1/1990 | Gallios | H02M 3/3378 363/61 |
| 5,008,800 | A * | 4/1991 | Klinkowstein | H02M 7/106 363/126 |
| 6,927,985 | B2 * | 8/2005 | Klinkowstein | H02M 3/3376 363/61 |
| 7,974,106 | B2 * | 7/2011 | Gurunathan | H02M 7/497 363/69 |
| 8,440,050 | B2 * | 5/2013 | Iwata | H01J 37/32091 700/121 |
| 8,558,486 | B2 * | 10/2013 | Smick | H02K 16/00 315/505 |
| 8,723,452 | B2 * | 5/2014 | Ryding | H05H 5/04 315/506 |
| 9,548,182 | B2 * | 1/2017 | Onishi | H01J 29/485 |
| 9,720,021 | B2 * | 8/2017 | Waugh | H02J 3/381 |
| 10,340,790 | B1 * | 7/2019 | Yasuhara | H02M 3/10 |
| 10,662,887 | B2 * | 5/2020 | Yoon | F02D 19/0623 |
| 11,228,252 | B2 * | 1/2022 | Rivas-Davila | H02M 3/33523 |
| 11,545,900 | B2 * | 1/2023 | Ahmed | H02M 3/01 |
| 11,581,521 | B2 * | 2/2023 | Wang | H01M 4/131 |
| 11,824,435 | B2 * | 11/2023 | Park | H02M 1/10 |
| 2002/0008981 | A1 * | 1/2002 | Jain | H02M 7/5387 363/132 |
| 2007/0195566 | A1 * | 8/2007 | Nielsen | H02M 1/32 363/53 |
| 2009/0021081 | A1 * | 1/2009 | Jacobson | H02M 7/53871 307/77 |
| 2013/0038130 | A1 * | 2/2013 | Lai | H02J 3/381 307/80 |
| 2017/0257036 | A1 | 9/2017 | Sasada et al. | |
| 2018/0175741 | A1 * | 6/2018 | Andersen | H02M 3/338 |
| 2020/0137862 | A1 * | 4/2020 | Kawaguchi | H05G 1/12 |
| 2020/0389099 | A1 * | 12/2020 | Sagasta | H02M 7/4837 |
| 2022/0230847 | A1 * | 7/2022 | Heckman | H01J 37/32174 |
| 2022/0393579 | A1 * | 12/2022 | Pulvirenti | H02M 1/0095 |
| 2024/0195294 | A1 * | 6/2024 | Pulvirenti | H02M 7/103 |

FOREIGN PATENT DOCUMENTS

| | | |
|---|---|---|
| JP | 6-70492 U | 9/1994 |
| JP | 11-225476 A | 8/1999 |
| JP | 2004-135363 A | 4/2004 |
| JP | 2005-294004 A | 10/2005 |
| JP | 2007-37268 A | 2/2007 |
| JP | 2007-236099 A | 9/2007 |
| JP | 2008-269915 A | 11/2008 |
| JP | 2012-155857 A | 8/2012 |
| JP | 2017-158277 A | 9/2017 |

OTHER PUBLICATIONS

WO2019173610 Sep. 2019.*
International Search Report (PCT/ISA/210) issued in PCT Application No. PCT/JP2020/028562 dated Sep. 8, 2020 with English translation (seven (7) pages).
Japanese-language Written Opinion (PCT/ISA/237) issued in PCT Application No. PCT/JP2020/028562 dated Sep. 8, 2020 (five (5) pages).

* cited by examiner

[FIG. 1]
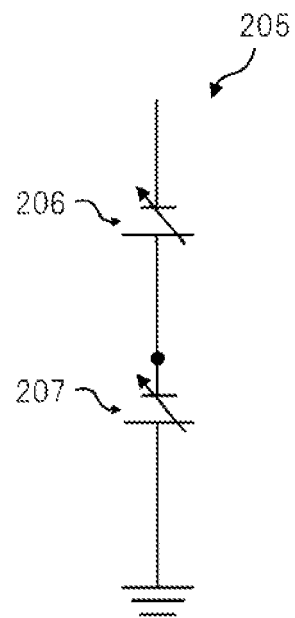

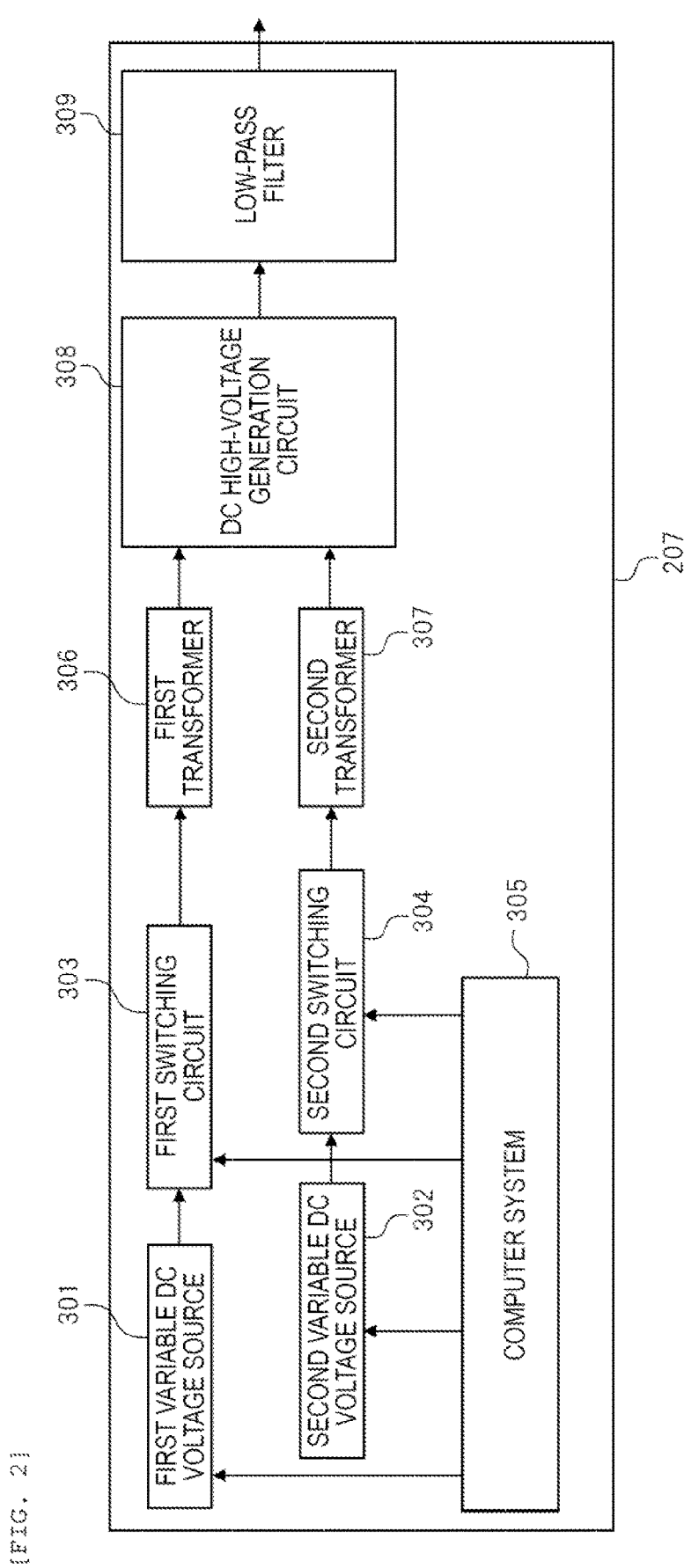
[FIG. 2]

[FIG. 3]
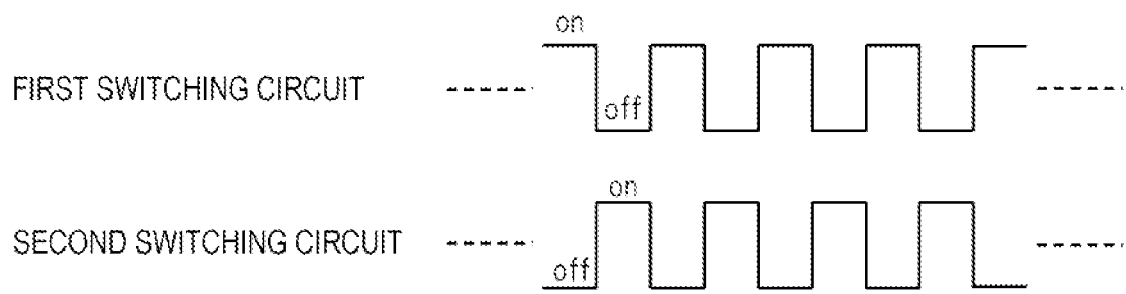
[FIG. 4]
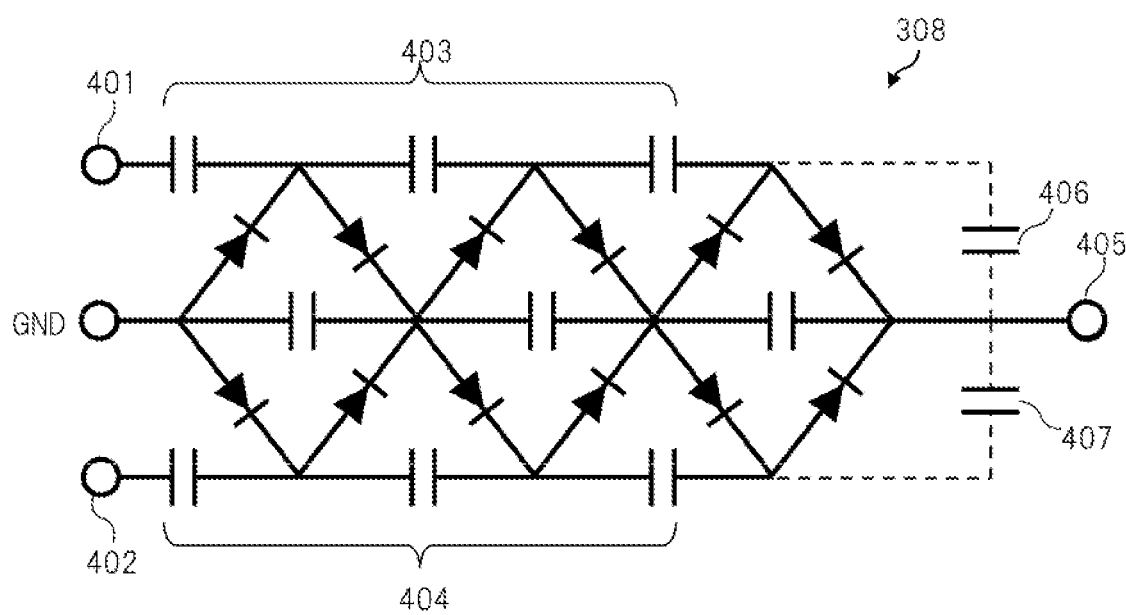

[FIG. 5]
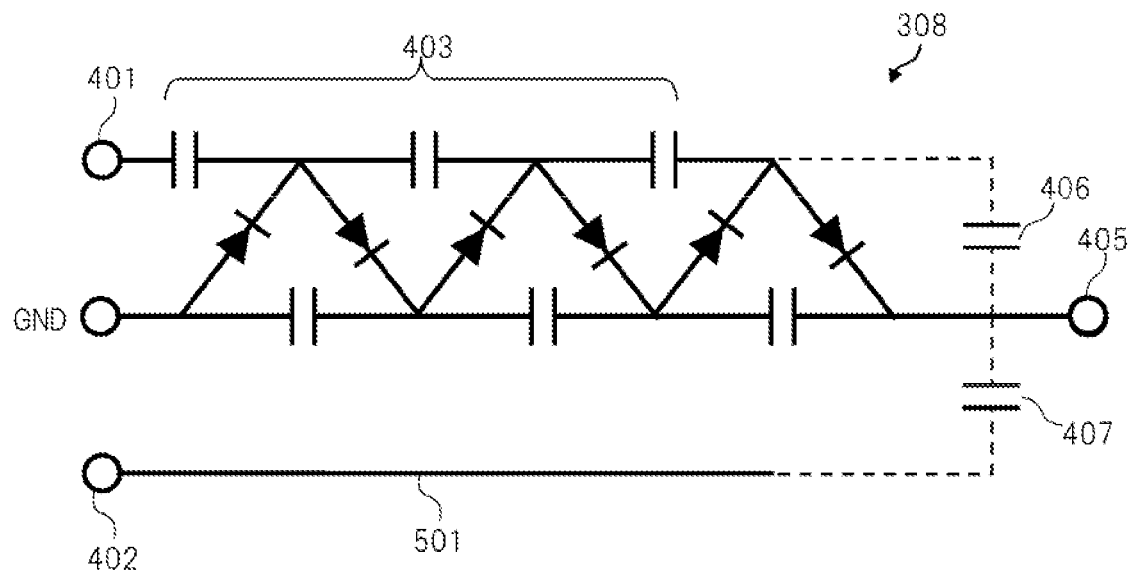
[FIG. 6]
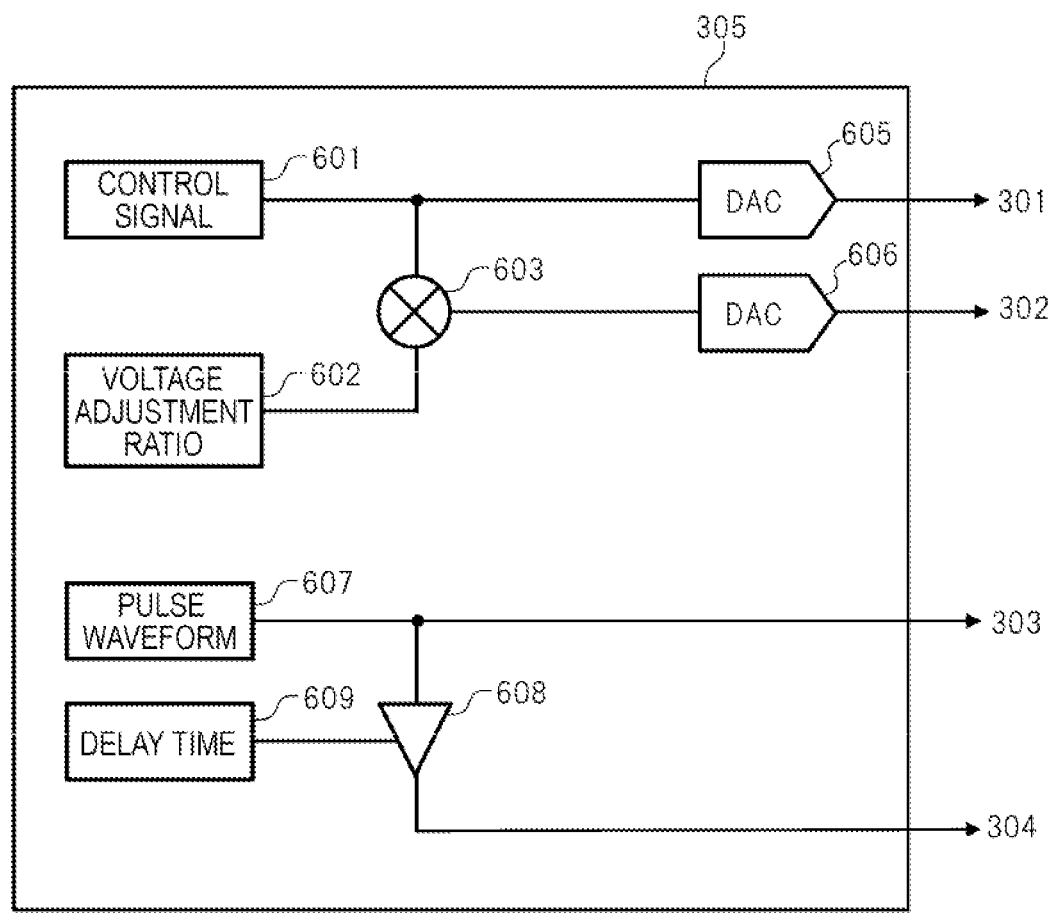

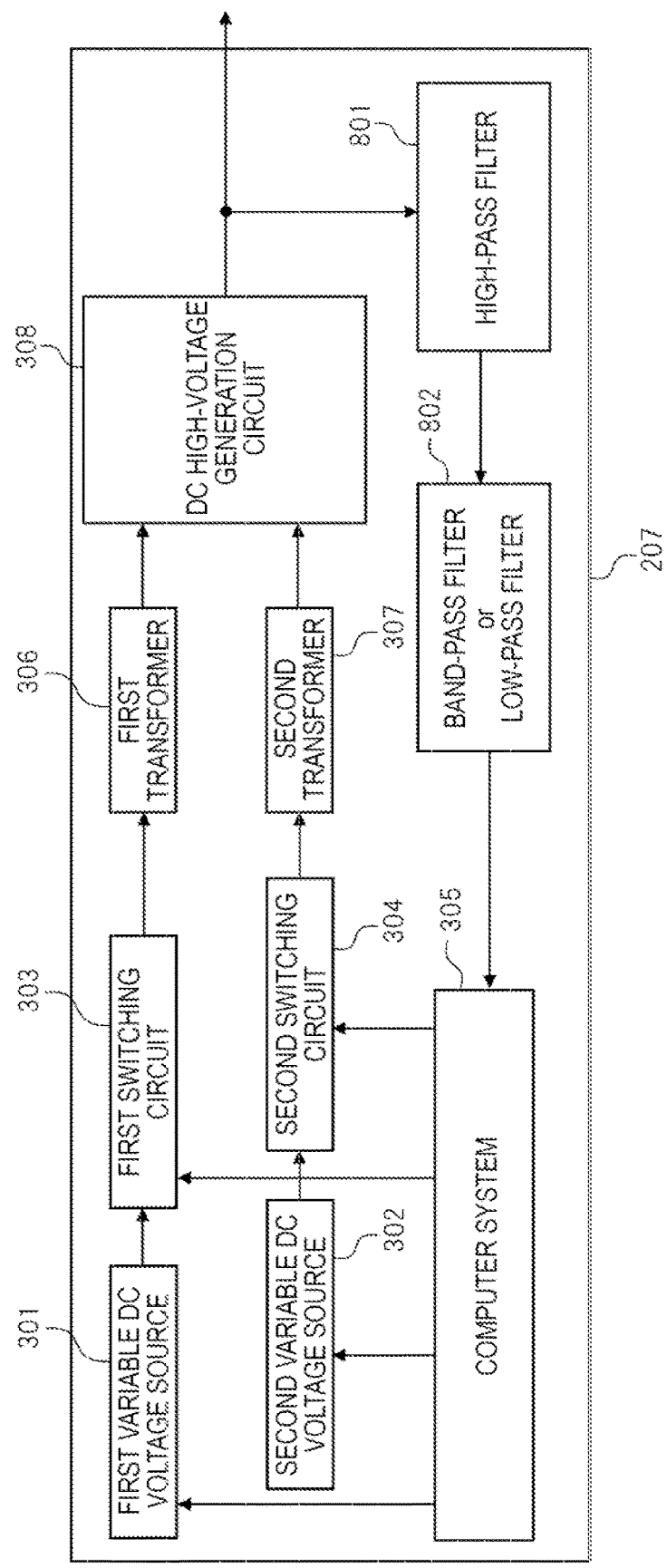

[FIG. 8]
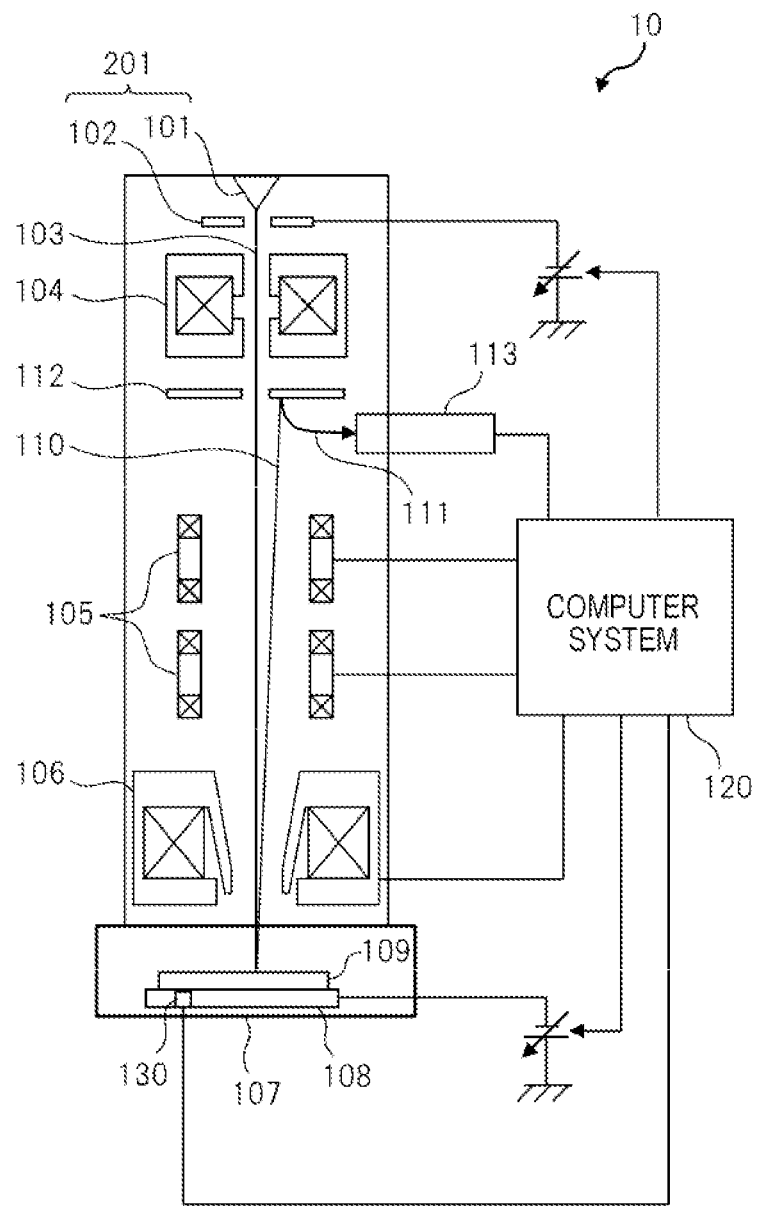

[FIG. 9]
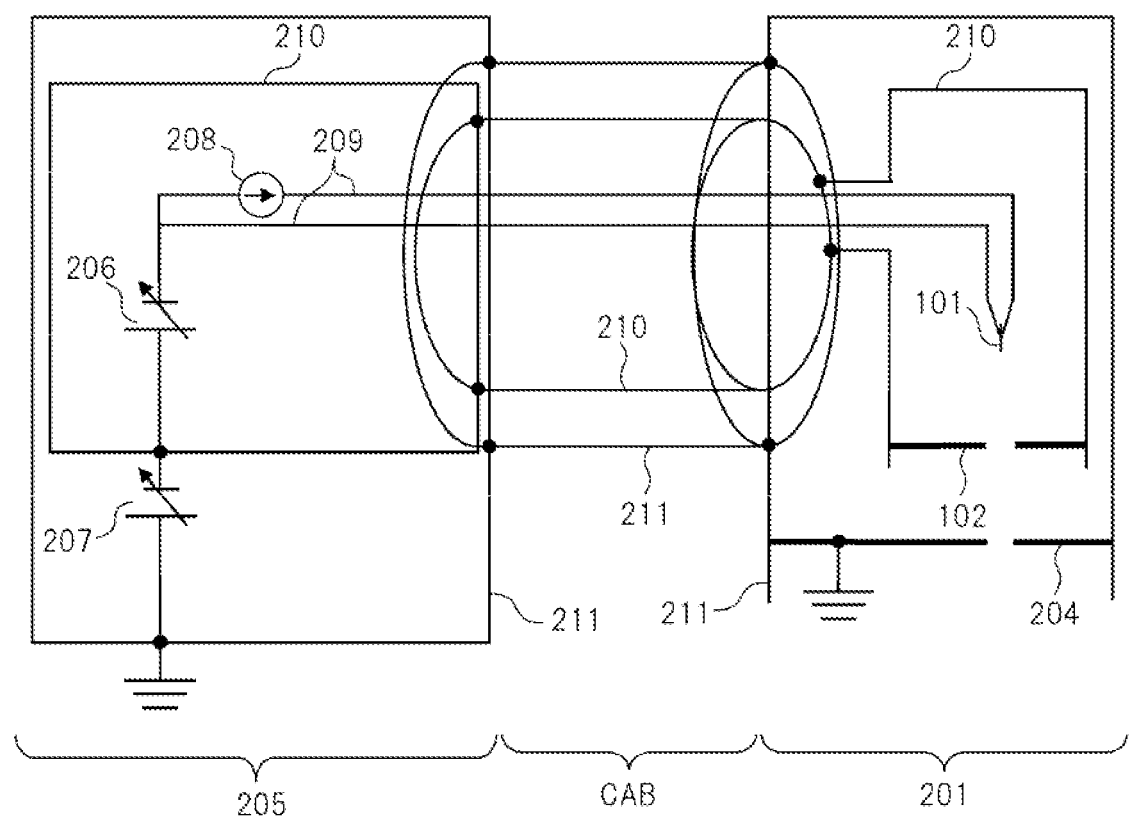

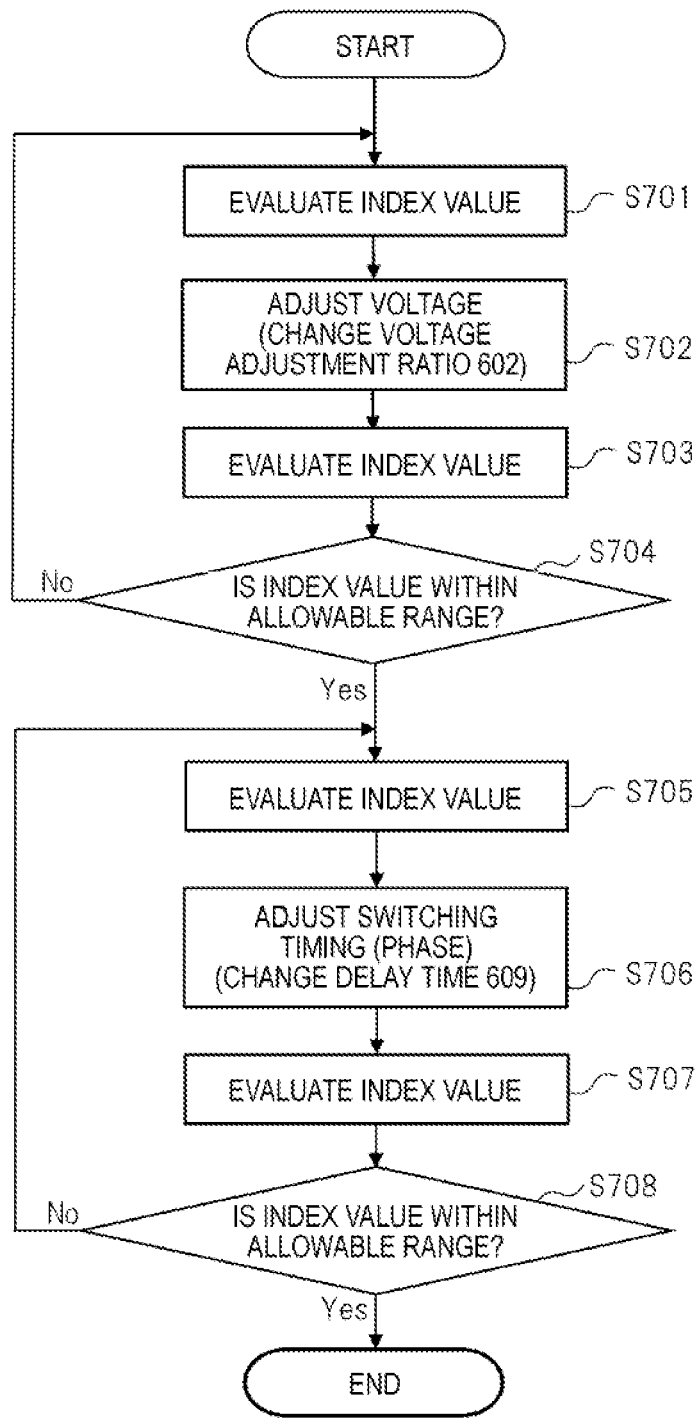
[FIG. 10]

[FIG. 11]
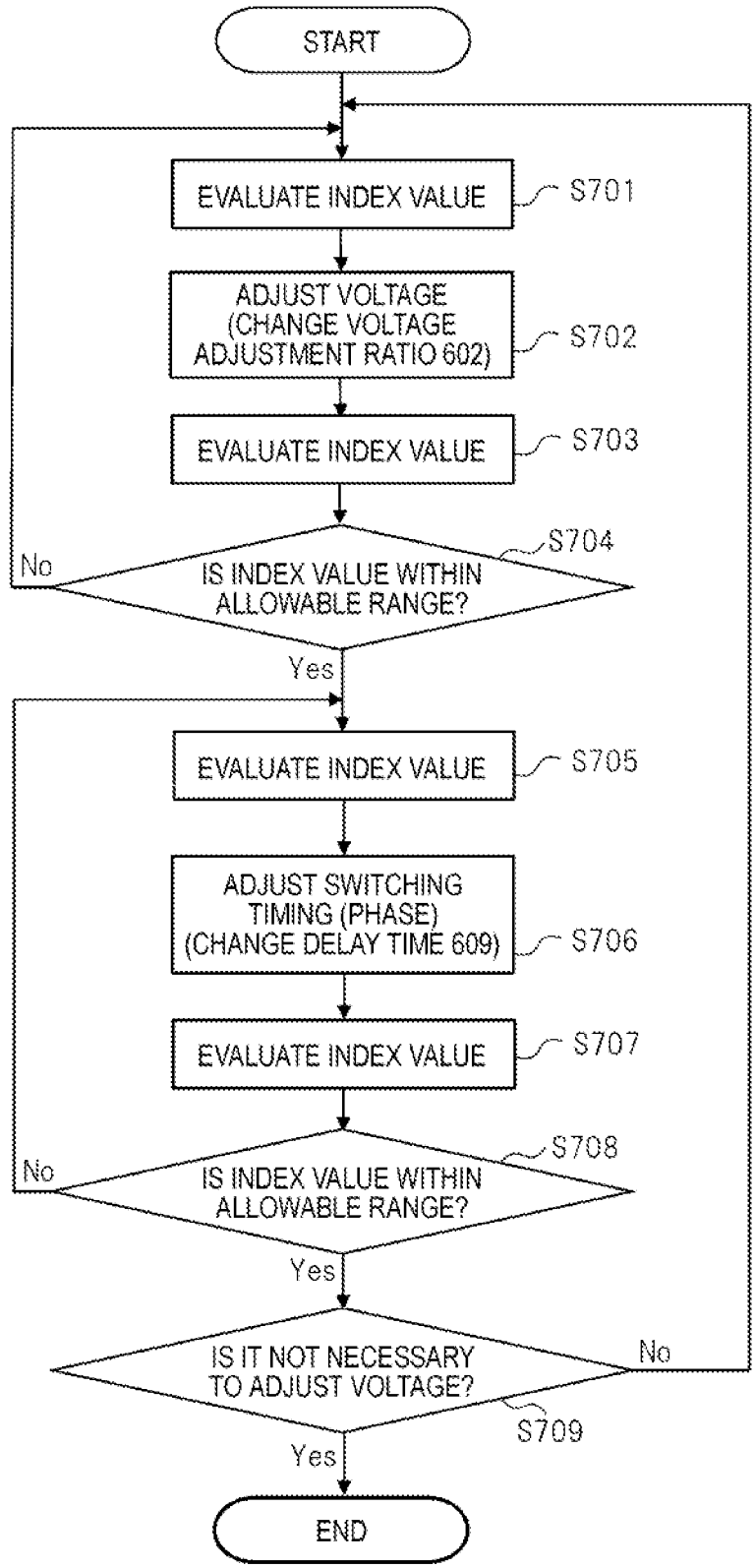

DC HIGH-VOLTAGE SOURCE DEVICE INCLUDING PLURALITY OF VARIABLE DC VOLTAGE SOURCES AND PLURALITY OF SWITCHING CIRCUITS, AND CHARGED PARTICLE BEAM DEVICE INCLUDING THE DC HIGH-VOLTAGE SOURCE DEVICE

TECHNICAL FIELD

The present invention relates to a DC high-voltage source device and a charged particle beam device including the DC high-voltage source device.

BACKGROUND ART

A charged particle beam device includes a scanning electron microscope (SEM), a scanning ion microscope (SIM), a focused ion beam (FIB) processing observation device, a transmission electron microscope (TEM), a scanning transmission electron microscope (STEM), and the like.

In a scanning electron microscope, a sample surface is scanned with an electron beam, and a generated signal electron is detected and imaged to execute magnification observation of the sample. In the scanning ion microscope, the magnification observation of a sample or the like is performed by scanning with an ion beam. In a focused ion beam processing observation device, processing and magnification observation of a sample using an ion beam are performed. In a transmission electron microscope and a scanning transmission electron microscope, magnification observation is performed by forming an image of electrons transmitting through a thin film-like sample.

Thus, the charged particle beam device using a charged particle beam such as an electron beam and an ion beam is used for observation, length measurement, analysis, processing, and the like of a fine structure in various fields. For example, defect observation, analysis, pattern dimension measurement, and the like are performed by using a scanning electron microscope in a semiconductor device manufacturing line.

The charged particle beam device includes a charged particle gun for generating and accelerating a charged particle beam. The charged particle gun includes a charged particle source, an extraction electrode, and an acceleration electrode. In the charged particle gun, a charged particle beam is generated by applying a DC high voltage of several kV between the charged particle source and the extraction electrode, and the charged particle beam is accelerated by applying a DC high voltage of several kV to several hundred kV between the extraction electrode and the acceleration electrode. The DC high voltage applied between the charged particle source and the acceleration electrode corresponds to the beam energy of the charged particle beam, and is one of the main factors determining the performance of the charged particle beam device such as the resolution of an image, the depth of focus, and the processing speed of a sample.

A charged particle beam device includes a DC high-voltage source device for generating a DC high voltage to be applied to a charged particle gun. Many DC high-voltage source devices for a charged particle gun include transformers and a Cockcroft-Walton circuit for rectifying and boosting an AC voltage into a DC voltage. The transformers and the Cockcroft-Walton circuit are mounted in an insulating resin material, an insulating gas, and an insulating oil within a range of sizes permitted in the operating environment of the charged particle beam device.

In the Cockcroft-Walton circuit, AC components (hereinafter, referred to as "ripple") are generated in the DC high voltage of an output unit due to electrostatic induction noise and electromagnetic induction noise generated by circuit components and a wiring to which an AC voltage is applied. The ripple of the DC high voltage to be applied to the charged particle gun is equivalent to the energy dispersion. Therefore, the ripple generated in the DC high voltage becomes a factor of lowering the resolution of the charged particle beam device.

A Schenkel-type DC high-voltage generation circuit is disclosed in JPH11-225476A (PTL 1), in which a distance adjustment mechanism is provided between a high-frequency drive electrode and a ground potential section to adjust the stray capacitance between the high-frequency drive electrode and the ground potential section, thereby adjusting the noise balance and completely canceling the ripple.

In JPS63-153788A (PTL 2), there is disclosed a technique for reducing the ripple without moving parts by adding a voltage source for varying AC voltages having two opposite phases to be input into a symmetrical Cockcroft-Walton circuit to a secondary coil of a transformer in series.

CITATION LIST

Patent Literature

PTL 1: JPH11-225476A
PTL 2: JPS63-153788U

SUMMARY OF INVENTION

Technical Problem

The ripple reduction mechanism by the movable adjustment can be applied to a symmetrical Cockcroft-Walton circuit. However, in order to apply the technique of PTL 1 to a circuit mounted in an insulating gas or an insulating oil, it is necessary to adjust a movable part from the outside of a gas container or an oil container, but it is extremely difficult. In addition, in the long run, there is also a risk of ripple re-occurring due to the displacement of the movable part. Further, it is not possible to provide a movable part to a circuit which is molded (fixed) by an insulating resin material.

In PTL 2, there is a description to the effect that a variable voltage is controlled so that a measured ripple value becomes a desired value by providing a ripple measurement circuit. However, this configuration has the following problems.

(1) Residual Ripple Due to Unequal Waveforms

Although it is described in PTL 2 that a variable voltage is in the same phase as a voltage waveform excited in a secondary coil of the transformer and that the amplitude is controlled by a voltage adjusting mechanism, specific computer system and control method are not described. The AC voltage supplied to the primary coil of the transformer is generated by turning on and off the switching element with respect to the DC voltage.

The generated AC voltage becomes a distortion waveform like a sine wave by the inductance of the primary coil of the transformer. Although the same voltage waveform as that of the primary coil is excited to the secondary coil of the transformer by changing the amplitude, it is necessary to generate the same voltage waveform in the variable voltage source in order to completely cancel the ripple of the output stage.

When the voltage waveform excited by the secondary coil and the variable voltage waveform do not match, the ripple remains, and the ripple becomes large as the voltage increases. In addition, even if the waveforms match and the ripple can be completely canceled, the ripple recurs because the amplitude of the voltage waveform changes when the output value of the DC high voltage is changed, and the amplitude of the variable voltage source needs to be re-adjusted.

(2) Noise Superimposition on Ripple Measurement Circuit

When noise generated by an AC application unit of a transformer or a Cockcroft-Walton circuit is superimposed on a ripple measurement circuit, a difference occurs between an actual ripple waveform of a DC high voltage and a ripple waveform measured by the ripple measurement circuit. Therefore, it becomes very difficult to adjust ripple of an actual output to zero by using a ripple measurement value as an index. The more compact the DC high voltage source, the more easily the noise is superimposed on the ripple measurement circuit, and such a phenomenon is manifested.

In view of this situation, an object of the present disclosure is to reduce ripple generated in a DC high voltage.

Solution to Problem

A brief outline of a representative invention disclosed in the present application is as follows.

According to a representative embodiment of the present disclosure, a DC high-voltage source device includes a first voltage source including a first variable DC voltage source, a second variable DC voltage source, a first switching circuit for generating an AC voltage from a DC voltage of the first variable DC voltage source, a second switching circuit for generating an AC voltage from a DC voltage of the second variable DC voltage source, a first transformer for transforming the AC voltage generated by the first switching circuit, a second transformer for transforming the AC voltage generated by the second switching circuit, a DC high-voltage generation circuit for generating a DC high voltage on the basis of the AC voltage after transformation supplied from the first transformer and the AC voltage after transformation supplied from the second transformer, and a computer system. The computer system independently adjusts a voltage value of the DC voltage of the first variable DC voltage source, a voltage value of the DC voltage of the second variable DC voltage source, a switching timing of the first switching circuit, and a switching timing of the second switching circuit.

Advantageous Effects of Invention

The effects obtained by a representative invention among the inventions disclosed in the present application are simply described as follows.

In other words, according to a representative embodiment of the present disclosure, it is possible to reduce the ripple generated at a DC high voltage.

BRIEF DESCRIPTION OF DRAWINGS

FIG. 1 is a diagram showing an example of a configuration of a DC high-voltage source device according to Embodiment 1 of the present disclosure.

FIG. 2 is a circuit block diagram showing an example of a first voltage source.

FIG. 3 is a diagram illustrating a switching timing of a switching circuit.

FIG. 4 is a circuit diagram showing an example of a DC high-voltage generation circuit.

FIG. 5 is a circuit diagram showing another example of the DC high-voltage generation circuit.

FIG. 6 is a circuit block diagram showing an example of a configuration of a computer system according to a modification example of Embodiment 1 of the present disclosure.

FIG. 7 is a circuit block diagram showing an example of a first voltage source according to Embodiment 2 of the present disclosure.

FIG. 8 is a diagram showing an example of a configuration of a charged particle beam device according to Embodiment 3 of the present disclosure.

FIG. 9 is a diagram showing a connection relation between an electron gun and a DC high-voltage source device in Embodiment 2 of the present disclosure.

FIG. 10 is a flowchart showing an example of a ripple reduction method.

FIG. 11 is a flowchart showing another example of the ripple reduction method.

DESCRIPTION OF EMBODIMENTS

In the following, embodiments of the present disclosure are described with reference to drawings. Respective embodiments described below are examples for realizing the present disclosure and do not limit the scope of the technique of the present disclosure. In an example, the same sign is given to members having the same function, and the repetitive description thereof is omitted except when particularly necessary.

Embodiment 1

<Configuration of DC High-Voltage Source Device>

FIG. 1 is a diagram showing an example of a configuration of a DC high-voltage source device according to Embodiment 1 of present disclosure. A DC high-voltage source device 205 includes a second voltage source 206 and a first voltage source 207 as shown in FIG. 1. The first voltage source 207 is provided on the upstream side, and the second voltage source 206 is provided on the downstream side, respectively, and the second voltage source 206 and the first voltage source 207 are connected in series.

The positive terminal of the first voltage source 207 is grounded. The DC high-voltage source device 205 adds the output voltage of the second voltage source 206 to the output voltage of the first voltage source 207 and outputs the added voltage. However, the DC high-voltage source device 205 may be configured with only the first voltage source 207.

FIG. 2 is a circuit block diagram showing an example of a first voltage source. The second voltage source 206 may also have the same configuration as the first voltage source 207 described below. The first voltage source 207 is a circuit that generates a DC high voltage of several tens kV to several hundreds kV. The first voltage source 207 includes a first variable DC voltage source 301, a second variable DC voltage source 302, a first switching circuit 303, a second switching circuit 304, a computer system 305, a first transformer 306, a second transformer 307, a DC high-voltage generation circuit 308, and a low-pass filter 309 as shown in FIG. 2.

The DC high-voltage source device 205 of the present disclosure can be applied to a product using the DC high-voltage generation circuit 308 such as a Cockcroft-Walton circuit, for example.

The first variable DC voltage source 301 is connected to the input terminal of the first switching circuit 303. The output terminal of the first switching circuit 303 is connected to the input terminal of the first transformer 306. The output terminal of the first transformer 306 is connected to a first input terminal 401 (FIG. 4) of the DC high-voltage generation circuit 308. The second variable DC voltage source 302 is connected to the input terminal of the second switching circuit 304. The output terminal of the second switching circuit 304 is connected to the input terminal of the second transformer 307. The output terminal of the second transformer 307 is connected to a second input terminal 402 (FIG. 4) of the DC high-voltage generation circuit 308. The output terminal of the DC high-voltage generation circuit 308 is connected to the input terminal of the low-pass filter 309. The output terminal of the low-pass filter 309 is connected to the input terminal of the second voltage source 206.

FIG. 3 is a diagram showing the switching timing of a switching circuit. The computer system 305 independently variably controls the voltage value of the first variable DC voltage source 301 and the voltage value of the second variable DC voltage source 302. In addition, the computer system 305 independently variably controls the switching timing of the first switching circuit 303 and the second switching circuit 304. As shown in FIG. 3, the on and off timings of the first switching circuit 303 and the second switching circuit 304 are reversed to each other. That is, during the operation of the first voltage source 207, the first switching circuit 303 is on, the second switching circuit 304 is off, and when the first switching circuit 303 is off, the second switching circuit 304 is on. In FIG. 3, a switching circuit shows an on state when the switching circuit is at a high level, and the switching circuit shows an off state when the switching circuit is at a low level. Thus, by alternately switching on and off of the first switching circuit 303 and the second switching circuit 304, AC voltages having phases opposite to each other are generated.

The computer system 305 can control the voltages of the AC waveforms input to the corresponding first transformer 306 and the second transformer 307 by controlling the voltage values of the first variable DC voltage source 301 and the second variable DC voltage source 302. In addition, the computer system 305 can control the phases of the AC waveforms by controlling the switching timings of the first switching circuit 303 and the second switching circuit 304.

In PTL 2 described above, although another voltage waveform is added to adjust the voltage of the voltage waveform of a transformer secondary coil, the voltage waveform to be adjusted and the additional voltage waveform must be matched to perfectly cancel the noise of a DC high voltage. On the other hand, since the voltage and phase of an AC voltage are directly adjusted in the present embodiment, the problem of PTL 2 does not arise.

The computer system 305 controls the voltage value of the first variable DC voltage source 301 and the voltage value of the second variable DC voltage source 302 and controls the switching timing of the first switching circuit 303 and the second switching circuit 304, for example, based on the ripple measurement result of a ripple measurement device provided outside the DC high-voltage source device 205. When ripple is measured in the DC high-voltage source device 205 or in the vicinity of the DC high-voltage source device 205, as described above, noise is superimposed on the measurement circuit, and the ripple cannot be measured accurately. For this reason, it is desirable that the ripple is measured by an external device.

The computer system 305 may be configured with, for example, a field programmable gate array (FPGA) or an application specific integrated circuit (ASIC).

The AC voltage generated by the switching control of the first switching circuit 303 and the second switching circuit 304 is boosted in the first transformer 306 and the second transformer 307, respectively, and then a DC high voltage is generated in the DC high-voltage generation circuit 308. The low-pass filter 309 is configured with, for example, a resistor and a capacitor, reduces the ripple of the output (DC high voltage) of the DC high-voltage generation circuit 308 and outputs the DC high voltage with the reduced ripple.

<<Symmetrical Cockcroft-Walton Circuit>>

FIG. 4 is a circuit diagram showing an example of a DC high-voltage generation circuit. In FIG. 4, a symmetrical Cockcroft-Walton circuit is illustrated as the DC high-voltage generation circuit 308. In the symmetrical Cockcroft-Walton circuit, the AC voltage (AC voltage from the first switching circuit 303) from the first transformer 306 is input to the first input terminal 401, and the AC voltage (AC voltage from the second switching circuit 304) from the second transformer 307 is input to the second input terminal 402. In this way, the symmetrical Cockcroft-Walton circuit is a two-input DC high-voltage generation circuit.

In the symmetrical Cockcroft-Walton circuit, arrangement of the capacitors and the diodes between the first input terminal 401 and an output terminal 405 and arrangement of the capacitors and the diodes between the second input terminal 402 and the output terminal 405 are symmetrical as shown in FIG. 4.

In the symmetrical Cockcroft-Walton circuit of FIG. 4, the electrostatic induction noise is superimposed on the output terminal 405 via a stray capacitance 406 between a capacitor group 403 and the output terminal 405 which are AC-driven and a stray capacitance 407 between a capacitor group 404 and the output terminal 405, but the ripple of the output stage is reduced because the noise from the stray capacitance 406 and the noise from the stray capacitance 407 cancel each other.

<<Basic Cockcroft-Walton Circuit>>

FIG. 5 is a circuit diagram showing another example of the DC high-voltage generation circuit. In FIG. 5, a basic Cockcroft-Walton circuit is illustrated as the DC high-voltage generation circuit 308. The basic Cockcroft-Walton circuit shown in FIG. 5 is a single-input DC high-voltage generation circuit from which a circuit on the side of the second input terminal 402 out of the symmetrical Cockcroft-Walton circuit shown in FIG. 4 is eliminated. The second input terminal 402 is connected to a wiring (signal line) 501 but not connected to the output terminal 405. The second input terminal 402 side of the DC high-voltage generation circuit 308 is driven by an AC voltage having a phase opposite to that of the first input terminal 401 in the same manner as the symmetric Cockcroft-Walton circuit. Noise at the output terminal 405 is canceled by the stray capacitance 407 between the wiring 501 and the output terminal 405, and the ripple is reduced.

When the Cockcroft-Walton circuit of FIG. 4 or 5 is employed, the noise at the output terminal 405 is canceled and the ripple is reduced, but it is difficult to cancel the noise completely due to the variation in characteristics and arrangement of the circuit components, and the ripple remains. Since the residual ripple becomes larger as the output voltage increases or as a voltage source is reduced in size, it has been difficult to achieve three of high voltage, reduced size, and low ripple (high accuracy) of a DC high voltage source.

However, as already mentioned, the computer system 305 can control the voltage and the phase independently of the AC voltage having two opposite phases to be input into the Cockcroft-Walton circuit while maintaining the waveform shape. As a result, the DC high voltage noise can be significantly reduced as compared with conventional systems.

<<Another Example of DC High-Voltage Generation Circuit>>

The DC high-voltage generation circuit 308 is configured with a plurality of diodes and a plurality of capacitors, and may be configured with a two-input rectifier circuit to which an AC voltage generated by the first switching circuit 303 and an AC voltage generated by the second switching circuit 304 are input.

In addition, the DC high-voltage generation circuit may be configured from a two-input Schenkel-type DC high-voltage generation circuit to which an AC voltage generated by the first switching circuit 303 and an AC voltage generated by the second switching circuit 304 are input. In such a configuration, the ripple can be reduced while generating a high voltage.

<Other Configurations>

A first amplifier circuit and a second amplifier circuit may be provided in place of the first switching circuit 303 and the second switching circuit 304. In this case, the first amplifier circuit and the second amplifier circuit amplify the AC signal from the computer system 305 and supply the amplified AC signal to the first transformer and the second transformer, respectively. In addition, the AC voltage output from the first amplifier circuit and the second amplifier circuit may be directly supplied to the DC high-voltage generation circuit 308 without providing the first transformer 306 and the second transformer 307. In such a configuration, the ripple can be reduced while generating a high voltage.

In this case, the first variable DC voltage source 301 and the second variable DC voltage source 302 can be omitted. The computer system 305 adjusts the voltage (amplitude) and phase of the AC voltage based on the ripple measurement result.

Major Effects of Present Embodiment

According to the present embodiment, the computer system 305 independently adjusts the voltage value of the DC voltage of the first variable DC voltage source 301, the voltage value of the DC voltage of the second variable DC voltage source 302, the switching timing of the first switching circuit 303, and the switching timing of the second switching circuit 304. With this configuration, it is possible to reduce the ripple generated in the DC high voltage.

In addition, according to the present embodiment, the DC high-voltage generation circuit is configured with a two-input symmetrical Cockcroft-Walton circuit. With this configuration, since the circuit configuration from the input terminal to the output terminal is symmetric between the input terminals, a high voltage can be obtained and the ripple can be easily reduced.

According to the circuit mounting configuration, a stray capacitance is also present between the capacitor groups 403 and 404 and the low-pass filter 309, and electrostatic induction noise bypasses the low-pass filter and sometimes appears as ripple without the action of the filter. However, even in this case, the computer system 305 controls the voltage value of the first variable DC voltage source 301 and the voltage value of the second variable DC voltage source 302, and controls the switching of the first switching circuit 303 and the second switching circuit 304, thereby reducing the ripple of the DC high voltage including the electrostatic induction noise.

In addition, in the present embodiment, since the ripple can be reduced by adjusting the AC voltages to be input to the DC high-voltage generation circuit 308, the low-pass filter 309 can be omitted. Thus, the responsiveness as the DC high-voltage source device 205 can be improved.

In addition, according to the present embodiment, the DC high-voltage generation circuit 308 is configured with a single-input basic Cockcroft-Walton circuit. At this time, the DC high-voltage generation circuit 308 includes an input terminal to which the AC voltage generated by the second switching circuit 304 is input, and the wiring 501 which is connected to the input terminal and electrostatically couples with the output terminal. With this configuration, it is possible to reduce the ripple of the DC high voltage while simplifying the configuration of the DC high-voltage generation circuit 308.

There is a concern that surge current and voltage are generated in the components of the secondary coil of a transformer and the Cockcroft-Walton circuit when a DC high voltage is discharged. Therefore, the addition of a variable voltage source in series with the secondary coil of the transformer may lead to an increase in the risk of a failure due to discharge.

However, according to the present embodiment, the first switching circuit 303 is provided between the first variable DC voltage source 301 and the first transformer 306. The second switching circuit 304 is provided between the second variable DC voltage source 302 and the second transformer 307. In this way, a variable DC voltage source and a switching circuit are provided on the primary coil side of the transformer in which a discharge surge hardly moves around, thereby reducing the risk of a failure.

Modification Example

Next, a modification example of the present embodiment is described. In the present modification example, a computer system is configured with a digital circuit system. FIG. 6 is a circuit block diagram showing an example of a configuration of the computer system according to the modification example of Embodiment 1 of the present disclosure.

The computer system 305 shown in FIG. 6 includes a digital multiplier 603, a first digital-to-analog converter 605 corresponding to the first variable DC voltage source 301, a second digital-to-analog converter 606 corresponding to the second variable DC voltage source 302, and a phase shifter 608.

The computer system 305 in the present modification example may be configured with digital circuits such as FPGA, ASIC, and digital signal processor (DSP), for example, and may include analog multipliers and delay circuits at least in part.

In the computer system 305, a control signal 601 and a voltage adjustment ratio 602 for controlling the voltage value of the first variable DC voltage source 301 are set according to the output DC high voltage, respectively. Here, the control signal 601 is a signal for defining the voltage of the first variable DC voltage source 301, and the voltage adjustment ratio 602 is a value indicating the ratio of the voltage of the second variable DC voltage source 302 to the first variable DC voltage source 301. The control signal 601 and the voltage adjustment ratio 602 may be input from the outside or generated inside the computer system 305 based on the input signal.

The control signal 601 is converted into an analog signal by the first digital-to-analog converter 605. The converted analog signal is supplied to the first variable DC voltage source 301, thereby controlling (adjusting) the voltage of the first variable DC voltage source 301.

On the other hand, the digital multiplier 603 multiplies the control signal 601 by the voltage adjustment ratio 602. The multiplied value is converted into an analog signal by the second digital-to-analog converter 606. The converted analog signal is supplied to the second variable DC voltage source 302, thereby controlling (adjusting) the voltage of the second variable DC voltage source 302.

The control signal 601 defines the voltage of the second variable DC voltage source 302, the voltage adjustment ratio 602 is defined as a value indicating the ratio of the voltage of the first variable DC voltage source 301 to the second variable DC voltage source 302, and the multiplied value of the digital multiplier 603 may be input to the first variable DC voltage source 301.

In addition, a periodic pulse waveform 607 and a delay time 609 for controlling the switching timing of the first switching circuit 303 are respectively set in the computer system 305 according to the output DC high voltage. Here, the delay time 609 is a value that defines the time difference of the switching timing of the second variable DC voltage source 302 with respect to the first variable DC voltage source 301. The pulse waveform 607 and the delay time 609 may be input from the outside or generated inside the computer system 305 based on the input signal.

The pulse waveform 607 is supplied to the first switching circuit 303. Thus, the switching timing of the first switching circuit 303 is adjusted, and the phase of the AC voltage input to the first transformer 306 is adjusted. On the other hand, the phase shifter 608 adjusts the switching timing of the second switching circuit 304 by giving a delay to the pulse waveform 607 based on the delay time 609 and can shift the phase of the pulse waveform 607 by a predetermined value. The phase-shifted pulse waveform 607 is supplied to the second switching circuit 304. Thus, the phase of the AC voltage input to the second transformer 307 is controlled.

The phase shifter may be provided only on the side of the first switching circuit 303, or may be provided on both the side of the first switching circuit 303 and the side of the second switching circuit 304.

The above-mentioned effects can be obtained even in the present modification example.

Embodiment 2

Next, Embodiment 2 is described. A DC high-voltage source device according to the present embodiment is configured to have a feedback function of correcting voltage fluctuations due to partial discharge at a DC high voltage output destination device. FIG. 7 is a circuit block diagram showing an example of a first voltage source according to Embodiment 2 of the present disclosure. The first voltage source 207 in FIG. 7 has a configuration in which the low-pass filter 309 is removed and a high-pass filter 801 and a band-pass filter 802 are added in FIG. 2. As shown in FIG. 7, the high-pass filter 801 and the band-pass filter 802 are connected in series between the output terminal of the DC high-voltage generation circuit 308 and the computer system 305.

The band-pass filter 802 may be a low-pass filter. However, a low-pass filter having a sufficiently high cutoff frequency is used in order to achieve responsiveness capable of following the voltage fluctuations of the partial discharge.

The input terminal of the high-pass filter 801 is connected to the output terminal of the DC high-voltage generation circuit 308. The output terminal of the high-pass filter 801 is connected to the input terminal of the band-pass filter 802. The output terminal of the band-pass filter 802 is connected to the input terminal of the computer system 305. Therefore, the first voltage source 207 of the present embodiment is configured so that the DC high voltage generated by the DC high-voltage generation circuit 308 is output as it is.

The high-pass filter 801 is configured with, for example, a capacitor and a resistor. An AC component of a DC high voltage is detected by the high-pass filter 801. In the AC component, a voltage fluctuation component mainly caused by partial discharge and a ripple component having a driving frequency of the Cockcroft-Walton circuit are mixed, but the ripple component is removed through the band-pass filter 802 or the low-pass filter, and only the voltage fluctuation component mainly caused by partial discharge is input into the computer system 305.

The computer system 305 controls the voltages of the first variable DC voltage source 301 and the second variable DC voltage source 302 by varying the control signal 601, for example, shown in FIG. 6 so as to correct the voltage fluctuations due to partial discharge.

In FIG. 2, the low-pass filter 309 is provided because there is little ripple caused by voltage and phase control by the computer system 305, but no feedback for correcting voltage fluctuations due to partial discharge is assumed. On the other hand, by eliminating the low-pass filter, it is possible to achieve high-speed responsiveness that follows voltage fluctuations of partial discharge while suppressing the occurrence of ripple.

Consequently, voltage fluctuations due to partial discharge can be reduced, and deterioration of device performance at the output destination of the DC high voltage can be prevented.

Further, the number of partial discharges is counted by providing a threshold value for the feedback signal, and a user is warned before a dielectric breakdown occurs so that the DC high-voltage source device can be replaced before the failure, and the availability of the DC high voltage output destination device, that is, the device connected to the DC high-voltage source device can be improved.

Embodiment 3

Next, Embodiment 3 is described. In the present embodiment, a charged particle beam device is described as an example of use of a DC high-voltage source device.
<Configuration of Charged Particle Beam Device>

FIG. 8 is a diagram showing an example of a configuration of a charged particle beam device according to Embodiment 3 of the present disclosure. In the following, a scanning electron microscope is used as an example of a charged particle beam device. In a scanning electron microscope 10, a DC high-voltage source device is used for generating a charged particle beam (103). The charged particles include, for example, electrons and ions.

As described in FIG. 8, the scanning electron microscope 10 includes an electron gun (charged particle gun) 201, a condenser lens 104 as one form of a focusing lens, a scanning deflector 105, an objective lens 106, a vacuum sample chamber 107, a conversion electrode 112, a detector 113, a computer system (charged particle beam device computer system) 120, and the like. A sample stage 108 and a sample 109 mounted on the sample stage 108 are disposed in the vacuum sample chamber 107. The electron gun 201 includes an electron source 101, an extraction electrode 102, and the like, and radiates the electron beam 103 toward the sample 109 by the DC high voltage supplied from the DC high-voltage source device 205. The configuration of the electron gun 201 will be described in detail later.

The electron beam 103 is drawn out from the electron source 101 by the extraction electrode 102 and accelerated toward the sample 109 by an acceleration electrode not shown in the drawing. The electron beam 103 is focused by the lens action of the objective lens 106 after being narrowed by the condenser lens 104, and radiated to the sample 109. At this time, the direction of the electron beam 103 is controlled by the scanning deflector 105 and the sample 109 is scanned one-dimensionally or two-dimensionally.

The electron beam 103 is decelerated by a voltage applied to an electrode built in the sample stage 108 and not shown in the drawing before reaching the sample 109. For example, in the case of an electron, a negative voltage is applied to the electrode of the sample stage 108.

When the sample 109 is irradiated with the electron beam 103, electrons 110 including secondary electrons and backscattered electrons are emitted from a beam irradiation location. The electrons 110 are accelerated to the electron source 101 side by an accelerating action based on the voltage applied to the sample 109. When the electrons 110 collide with the conversion electrode 112, secondary electrons 111 are emitted. The secondary electrons 111 emitted from the conversion electrode 112 are captured by the detector 113, and the output of the detector 113 is changed by the amount of the captured secondary electrons. The luminance of a display device not shown is changed in accordance with the output. When a two-dimensional image is formed, for example, an image a of a scanning region is formed by synchronizing deflection signal to the scanning deflector 105 with an output of the detector 113. In addition to a deflection signal for two-dimensionally scanning the inside of the visual field, a deflection signal for moving the visual field may be supplied to the scanning deflector 105 in a superposed manner.

The deflection of the electron beam by the deflection signal, called also image shift deflection, is made possible to move the visual field position of the electron microscope without moving the sample 109 by the sample stage 108. In the present embodiment, although an example for performing image shift deflection and scanning deflection by a common deflector is shown, a deflector for image shift and a deflector for scanning may be separately provided.

The computer system 120 has, for example, a function of controlling each component of the scanning electron microscope 10, a function of forming an image based on detected electrons, and a function of measuring the pattern width of a pattern formed on a sample based on intensity distribution of detected electrons called a line profile.

The computer system 120 controls the voltage applied to the sample 109 or the sample stage 108 or controls the scanning electron microscope 10 based on the monitoring result of a pressure gage 130 provided on the electrostatic chuck in the vacuum sample chamber 107, thereby executing or interrupting the measurement.

The computer system 120 includes a computer system for evaluating an image generated based on the detection signal, and each arithmetic processing is executed in the computer system. The computer system for evaluating the image may be provided separately from the computer system for performing various kinds of control of the scanning electron microscope 10.

A storage medium for storing various programs to be executed by the computer system 120 is provided. The programs include a program for driving each component of the scanning electron microscope 10, a program for executing the flow of FIGS. 10 and 11, and the like. The storage medium may store a program to be executed by the computer system 305 of the DC high-voltage source device 205. The computer system 305 may store a program to be executed by itself. These storage media may be provided separately from the computer systems 120 and 305.

FIG. 9 is a diagram showing a connection relation between the electron gun and the DC high-voltage source device in Embodiment 2 of the present disclosure. As shown in FIG. 9, the electron gun 201 and the DC high-voltage source device 205 are connected to each other via a connection cable CAB. For example, the electron gun 201 is connected to the output terminal of the DC high-voltage source device 205 via the connection cable CAB. The electron gun 201 is, for example, a cold cathode field emission type electron gun.

In the present embodiment, at least a part of the DC high-voltage source device 205 is mounted on either an insulating gas, an insulating oil, or an insulating resin material. Since the insulating force of the DC high-voltage source device 205 can be improved by using the insulating material, the DC high-voltage source device 205 can be reduced in size. Although electrostatic coupling and noise superposition may be easily generated as the DC high-voltage source device 205 is reduced in size, the voltage of the variable DC voltage source and the switching timing of the switching circuit can be adjusted for each input system of the DC high-voltage generation circuit 308. As a result, the control of ripple reduction is not affected.

The electron gun 201 includes the electron source 101 as an emitter of electrons, the extraction electrode 102, and an acceleration electrode 204 as shown in FIG. 9. The electron source 101 is connected to the output terminal of the second voltage source 206 through a wiring 209, and the DC high voltage generated in the DC high-voltage source device 205 is supplied to the electron source 101.

A first enclosure 210 is provided so as to cover the second voltage source 206, a current source 208, the wiring 209, and the electron source 101. The first enclosure 210 connects the output terminal of the first voltage source 207 and the extraction electrode 102 as shown in FIG. 9. A second enclosure 211 is provided so as to cover the first voltage source 207 and the first enclosure 210. That is, the second enclosure 211 has a function as a housing of the DC high-voltage source device 205. The second enclosure 211 (that is, housing) is grounded to the ground and connects the acceleration electrode 204 to the ground. Thus, the potential of the acceleration electrode 204 is set to the reference potential of the first voltage source 207 (ground potential in FIG. 9).

Thus, an applied voltage is generated between the acceleration electrode 204 and the extraction electrode 102, and an applied voltage between the extraction electrode 102 and the electron source 101 is generated by the second voltage source 206 superposed on the voltage.

On the other hand, as a general configuration, an applied voltage can be generated between the acceleration electrode 204 and the electron source 101 by the first voltage source 207, and an applied voltage can be generated between the electron source 101 and the extraction electrode 102 by the second voltage source 206 superposed on the voltage. In either configuration, a DC high voltage of several kV and a DC high voltage of several tens to several hundreds kV are generated by the second voltage source 206 and the first voltage source 207, respectively.

In the DC high-voltage source device 205 shown in FIG. 9, two wirings 209 are connected to the output terminal of the second voltage source 206, and the current source 208 is provided on one of the wirings. The current source 208 is connected in series to the output terminal of the second voltage source 206, and supplies a current for cleaning the electron source 101 contaminated with the particles or the like to the electron source 101 through the wirings 209.

<Ripple Reduction Method (1)>

Next, an example of a ripple reduction method in a charged particle beam device is described. FIG. 10 is a flowchart showing an example of a ripple reduction method. Steps S701 to S708 are included in FIG. 10. Steps S701 to S704 are steps related to voltage adjustment, and steps S705 to S708 are steps related to phase adjustment.

In step S701, the computer system 120 in FIG. 8 evaluates the ripple by the acquired index value. As the index value, for example, the resolution of the SEM image (inspection image), the amount of beam swing synchronized with the switching frequency, and the like are used as index values. In addition to the above, the output of the DC high-voltage source device 205 may be connected to a ripple measurement device outside the device, and the ripple measurement value directly measured by the ripple measurement device may be used as an index value. When acquiring any of the index values, a measurement system included in the DC high-voltage source device is not used.

In step S702, the voltages of the first variable DC voltage source 301 and the second variable DC voltage source 302 are adjusted based on the ripple evaluation result obtained by evaluating the index value in step S701. The computer system 120 generates voltage adjustment information of the first variable DC voltage source 301 and the second variable DC voltage source 302 based on the evaluation result of the ripple and outputs the voltage adjustment information to the computer system 305. The computer system 305 generates voltage adjustment signals for adjusting the voltages of the first variable DC voltage source 301 and the second variable DC voltage source 302 based on the input voltage adjustment information, and outputs the generated voltage adjustment signals to the first variable DC voltage source 301 and the second variable DC voltage source 302, respectively.

Alternatively, when the computer system 305 is configured as shown in FIG. 6, the computer system 120 generates the control signal 601 and the voltage adjustment ratio 602 shown in FIG. 6 based on the evaluation result of the index value and outputs the control signal 601 and the voltage adjustment ratio 602 to the computer system 305. The computer system 305 generates voltage adjustment signals of analog signals based on the input control signal 601 and the voltage adjustment ratio 602, and outputs the generated voltage adjustment signals to the first variable DC voltage source 301 and the second variable DC voltage source 302, respectively. The voltage can be adjusted by changing only the voltage adjustment ratio 602 without changing the control signal 601.

Thus, the voltages of the first variable DC voltage source 301 and the second variable DC voltage source 302 are adjusted.

In step S703, ripple is evaluated by an index value acquired after voltage adjustment in step S702. Since the processing of step S703 is the same as that of step S701, the details are omitted.

In step S704, it is determined whether the index value is within the allowable range based on the evaluation result in step S703. If the index value is within the allowable range (Yes), the processing of step S705 is executed. Meanwhile, when the index value is not within the allowable range (No), the processing returns to step S701, and the processing of steps S701 to S704 is executed again. That is, when the index value is not within the allowable range, the voltage adjustment ratio 602 and the like are adjusted again.

Since the phase has not been adjusted until step S704, the index value may not fall within the allowable range. In this case, a transition to a step for performing phase adjustment without delay may be performed by temporarily relaxing the allowable range.

In step S705, ripple is evaluated by the index value. The index value evaluated here is, for example, a value acquired in the preceding step S703. In step S705, the index value is evaluated again from the viewpoint of phase adjustment.

In step S706, the switching timings of the first switching circuit 303 and the second switching circuit 304, that is, the phases of the AC voltages supplied to the first transformer 306 and the second transformer 307 are adjusted based on the ripple evaluation result obtained by evaluation with the index value in step S705. The computer system 120 generates switching timing adjustment information of the first switching circuit 303 and the second switching circuit 304 based on the evaluation result of the index value and outputs the generated switching timing adjustment information to the computer system 305. The computer system 305 generates respective switching timing adjustment signals for adjusting the switching timings of the first switching circuit 303 and the second switching circuit 304 based on the input switching timing adjustment information, and outputs the generated switching timing adjustment signals to the first switching circuit 303 and the second switching circuit 304, respectively.

Alternatively, if the computer system 305 has a configuration shown in FIG. 6, the computer system 120 generates the delay time 609 shown in FIG. 6 based on the evaluation result of the index value and outputs the generated delay time 609 to the computer system 305. The computer system 305 generates a phase adjustment signal based on the input delay time 609 and outputs the generated phase adjustment signal to the phase shifter 608. The phase may be adjusted by changing only the delay time of the second switching circuit 304 without changing the pulse waveform 607. When a phase shifter is provided in a connection node with the first switching circuit 303, the computer system generates a phase adjustment signal for each phase shifter.

Thus, the phases of the AC voltages generated by the first switching circuit 303 and the second switching circuit 304 are adjusted.

In step S707, ripple is evaluated by an index value acquired after the phase adjustment in step S706. Since the processing of step S707 is the same as that of step S705, the details are omitted.

In step S708, it is determined whether the index value is within the allowable range based on the evaluation result in step S707. When the index value is within the allowable range (Yes), the adjustment of the ripple is finished. Meanwhile, when the index value is not within the allowable range (No), the processing returns to step S705, and the processing of step S705 to S708 is executed again. That is, if the index value is not within the allowable range, adjustment of the delay time 609 is performed again.

<Ripple Reduction Method (2)>

Next, another example of a ripple reduction method in a charged particle beam device is described. FIG. 11 is a flowchart showing another example of the ripple reduction method. In FIG. 11, step S709 is added to FIG. 10, and the flow is such that voltages can be adjusted after voltage adjustment and phase adjustment are performed.

In step S709, after the phases are adjusted, it is determined whether or not the voltages need to be re-adjusted. Whether or not to re-adjust the voltages may be selected by the user, and may be automatically determined, for example, based on whether or not the index value after the phase adjustment is within a predetermined range. In this case, if the index value after the phase adjustment is not within the predetermined range, it is determined that the voltages need to be re-adjusted (No). On the other hand, if the index value after the phase adjustment is within the predetermined range, it is determined that the voltage re-adjustment is not necessary (Yes).

In FIGS. 10 and 11, it is shown that the phases are adjusted after the voltages are adjusted, but the voltages may be adjusted after the phases are adjusted. In this case, in step S709 of FIG. 11, it is determined whether or not the phases need to be re-adjusted.

Major Effects of Present Embodiment

According to the present embodiment, the DC high-voltage source device 205 is connected to the electron gun 201, and a DC high voltage is used for electron radiation. With this configuration, it is possible to radiate a high-quality electron beam with reduced ripple and improve the resolution in the inspection image.

According to the present embodiment, the computer system 120 generates voltage adjustment information of the first variable DC voltage source 301 and the second variable DC voltage source 302 based on an evaluation result of the ripple and outputs the generated voltage adjustment information to the computer system 305. With this configuration, the ripple can be evaluated without superimposing noise on the DC high-voltage source device 205. Thus, the ripple can be more reliably reduced.

According to the present embodiment, the computer system 120 generates switching timing adjustment information of the first switching circuit 303 and the second switching circuit 304 based on an evaluation result of the ripple and outputs the generated switching timing adjustment information to the computer system 305. With this configuration, the ripple can be evaluated without superimposing noise on the DC high-voltage source device 205. Thus, the ripple can be more reliably reduced.

According to the present embodiment, the index value is the resolution of the inspection image or the amount of beam swing synchronized with the switching frequency of the first switching circuit 303 or the second switching circuit 304. With this configuration, the ripple can be evaluated without superimposing noise on the DC high-voltage source device 205. Thus, the ripple can be more reliably reduced.

The voltage adjustment ratio 602 and the delay time 609 are relative values. Thus, even when the voltage value of the DC high voltage is changed and the control signal 601 for controlling the voltage value of the first variable DC voltage source 301 is changed, ripple can be reduced without re-adjusting the voltage adjustment ratio 602 and the delay time 609. In order to reduce the machine difference between the devices, the voltage adjustment ratio 602 and the delay time 609 may be adjusted so as to be aligned with other devices, rather than making each index value an optimum value.

In the DC high-voltage source device 205 that is reduced in size, the noise emitted from the transformer or the Cockcroft-Walton circuit where an AC voltage is applied is also superimposed on the feedback systems 801 and 802, and ripple components that do not exist in an actual DC high voltage output often occur.

If feedback control is performed by using this ripple, there is a risk of increasing the ripple. Therefore, for ripple, for example, an index value of an SEM image or a measurement system outside a voltage source device is used to compensate the ripple according to the adjustment flowchart and limit the target of the feedback system to the voltage fluctuations of the partial discharge, thereby reducing the voltage fluctuations with higher accuracy.

The disclosure is not limited to the embodiment described above and includes various modification examples. For example, in the present embodiment, a cold-cathode field emission electron gun is described as an example, but the present disclosure can be applied to other electron guns and ion guns such as a thermionic electron gun and a Schottky electron gun. The control method and configuration of the present disclosure can be applied to a component of a charged particle beam barrel (column), a voltage supply to a material stage, and a DC high voltage source for an electrostatic chuck in addition to an electron gun.

Further, a part of the configuration of a certain embodiment can be replaced with the configuration of another embodiment, and the configuration of another embodiment can be added to the configuration of a certain embodiment.

Further, it is possible to add, delete, or replace other configurations for a part of the configuration of each embodiment. The components and relative sizes described in the drawings are simplified and idealized in order to describe the present disclosure in an easy-to-understand manner, and may be more complex in terms of mounting.

REFERENCE SIGNS LIST

10: scanning electron microscope
101: electron source
120, 305: computer system
201: electron gun
205: DC high-voltage source device
206: second voltage source
207: first voltage source
301: first variable DC voltage source
302: second variable DC voltage source
303: first switching circuit
304: second switching circuit
306: first transformer
307: second transformer
308: DC high-voltage generation circuit
601: control signal
602: voltage adjustment ratio
603: digital multiplier
605: first digital-to-analog converter
606: second digital-to-analog converter
607: pulse waveform
608: phase shifter
609: delay time

The invention claimed is:

1. A DC high-voltage source device comprising:
a first voltage source including
a first variable DC voltage source,
a second variable DC voltage source,
a first switching circuit that generates an AC voltage from a DC voltage of the first variable DC voltage source,
a second switching circuit that generates an AC voltage from a DC voltage of the second variable DC voltage source,
a DC high-voltage generation circuit that generates a DC high voltage based on the AC voltage generated by the first switching circuit and the AC voltage generated by the second switching circuit; and
a computer system, wherein
the computer system independently adjusts a voltage value of the DC voltage of the first variable DC voltage source, a voltage value of the DC voltage of the second variable DC voltage source, a switching timing of the first switching circuit, and a switching timing of the second switching circuit,
the computer system includes a digital multiplier, a first digital-to-analog converter corresponding to the first variable DC voltage source, and a second digital-to-analog converter corresponding to the second variable DC voltage source,
the first digital-to-analog converter converts a control signal for defining a voltage of the first variable DC voltage source into an analog signal and supplies the analog signal to the first variable DC voltage source to adjust the voltage of the first variable DC voltage source,
the digital multiplier multiplies the control signal by a voltage adjustment ratio that indicates a ratio of a voltage of the second variable DC voltage source to the first variable DC voltage source, and
the second digital-to-analog converter converts the multiplied value of the digital multiplier into an analog signal and supplies the analog signal to the second variable DC voltage source to adjust the voltage of the second variable DC voltage source.

2. The DC high-voltage source device according to claim 1, wherein
the DC high-voltage generation circuit is a two-input symmetrical Cockcroft-Walton circuit to which the AC voltage generated by the first switching circuit and the AC voltage generated by the second switching circuit are input.

3. A DC high-voltage source device comprising:
a first voltage source including
a first variable DC voltage source,
a second variable DC voltage source,
a first switching circuit that generates an AC voltage from a DC voltage of the first variable DC voltage source,
a second switching circuit that generates an AC voltage from a DC voltage of the second variable DC voltage source,
a DC high-voltage generation circuit that generates a DC high voltage based on the AC voltage generated by the first switching circuit and the AC voltage generated by the second switching circuit; and
a computer system, wherein
the computer system independently adjusts a voltage value of the DC voltage of the first variable DC voltage source, a voltage value of the DC voltage of the second variable DC voltage source, a switching timing of the first switching circuit, and a switching timing of the second switching circuit,
the DC high-voltage generation circuit is a two-input symmetrical Cockcroft-Walton circuit to which the AC voltage generated by the first switching circuit and the AC voltage generated by the second switching circuit are input, and
the DC high-voltage generation circuit is configured with a plurality of diodes and a plurality of capacitors, and a first circuit configuration between a first input terminal on the first switching circuit side and an output terminal is symmetric with a second circuit configuration between a second input terminal on the second switching circuit side and the output terminal.

4. A DC high-voltage source device comprising:
a first voltage source including
a first variable DC voltage source,
a second variable DC voltage source,
a first switching circuit that generates an AC voltage from a DC voltage of the first variable DC voltage source,
a second switching circuit that generates an AC voltage from a DC voltage of the second variable DC voltage source,
a DC high-voltage generation circuit that generates a DC high voltage based on the AC voltage generated by the first switching circuit and the AC voltage generated by the second switching circuit; and
a computer system, wherein
the computer system independently adjusts a voltage value of the DC voltage of the first variable DC voltage source, a voltage value of the DC voltage of the second variable DC voltage source, a switching timing of the first switching circuit, and a switching timing of the second switching circuit, and
the DC high-voltage generation circuit is a single-input basic Cockcroft-Walton circuit to which the AC voltage generated by the first switching circuit is input, and includes a signal line which receives the AC voltage generated by the second switching circuit and electrostatically couples with the output terminal thereof.

5. The DC high-voltage source device according to claim 4, wherein
the DC high-voltage generation circuit is configured with a plurality of diodes and a plurality of capacitors, and is a two-input rectifier circuit to which the AC voltage generated by the first switching circuit and the AC voltage generated by the second switching circuit are input.

6. A DC high-voltage source device comprising:
a first voltage source including
a first variable DC voltage source,
a second variable DC voltage source,
a first switching circuit that generates an AC voltage from a DC voltage of the first variable DC voltage source,
a second switching circuit that generates an AC voltage from a DC voltage of the second variable DC voltage source,
a DC high-voltage generation circuit that generates a DC high voltage based on the AC voltage generated by the first switching circuit and the AC voltage generated by the second switching circuit; and
a computer system, wherein
the computer system independently adjusts a voltage value of the DC voltage of the first variable DC voltage source, a voltage value of the DC voltage of the second variable DC voltage source, a switching timing of the first switching circuit, and a switching timing of the second switching circuit, the DC high-voltage generation circuit is a two-input Schenkel-type DC high-voltage generation circuit to which the AC voltage generated by the first switching circuit and the AC voltage generated by the second switching circuit are input.

7. The DC high-voltage source device according to claim 6, further comprising:
a first transformer that transforms the AC voltage generated by the first switching circuit; and
a second transformer that transforms the AC voltage generated by the second switching circuit, wherein
the DC high-voltage generation circuit generates the DC high voltage based on the AC voltage after transformation supplied from the first transformer and the AC voltage after transformation supplied from the second transformer.

8. A DC high-voltage source device comprising:
a first voltage source including
a first variable DC voltage source,
a second variable DC voltage source,
a first switching circuit that generates an AC voltage from a DC voltage of the first variable DC voltage source,
a second switching circuit that generates an AC voltage from a DC voltage of the second variable DC voltage source,
a DC high-voltage generation circuit that generates a DC high voltage based on the AC voltage generated by the first switching circuit and the AC voltage generated by the second switching circuit; and
a computer system, wherein
the computer system independently adjusts a voltage value of the DC voltage of the first variable DC voltage source, a voltage value of the DC voltage of the second variable DC voltage source, a switching timing of the first switching circuit, and a switching timing of the second switching circuit,
the computer system includes a phase shifter,
a periodic pulse waveform for controlling a switching timing of the first switching circuit is supplied to the first switching circuit, and
the phase shifter adjusts a switching timing of the second switching circuit by giving a delay to the pulse waveform based on a delay time which defines a time difference of the switching timing of the second variable DC voltage source with respect to the first variable DC voltage source.

9. The DC high-voltage source device according to claim 3, wherein
a high-pass filter and a band-pass filter are connected in series between an output terminal of the DC high-voltage generation circuit and the computer system.

10. The DC high-voltage source device according to claim 3, wherein
a high-pass filter and a low-pass filter are connected in series between an output terminal of the DC high-voltage generation circuit and the computer system.

11. A DC high-voltage source device comprising:
a first voltage source including
a first variable DC voltage source,
a second variable DC voltage source,
a first switching circuit that generates an AC voltage from a DC voltage of the first variable DC voltage source,
a second switching circuit that generates an AC voltage from a DC voltage of the second variable DC voltage source,
a DC high-voltage generation circuit that generates a DC high voltage based on the AC voltage generated by the first switching circuit and the AC voltage generated by the second switching circuit; and
a computer system, wherein
the computer system independently adjusts a voltage value of the DC voltage of the first variable DC voltage source, a voltage value of the DC voltage of the second variable DC voltage source, a switching timing of the first switching circuit, and a switching timing of the second switching circuit, and
the computer system controls a voltage of the first variable DC voltage source and a voltage of the second variable DC voltage source and controls a switching timing of the first switching circuit and the second switching circuit based on a measurement result of ripple of the DC high voltage by a ripple measurement device provided outside.

12. The DC high-voltage source device according to claim 3, further comprising:
a second voltage source that is connected in series with the first voltage source.

13. A charged particle beam device comprising:
the high-voltage source device according to claim 3;
a charged particle gun that is connected to an output terminal of the DC high-voltage source device; and
a charged particle beam device computer system that controls the charged particle beam device, wherein
the charged particle beam device computer system evaluates ripple of the DC high voltage by using an index value acquired from an inspection image formed by radiating a charged particle beam, generates voltage adjustment information of the first variable DC voltage source and the second variable DC voltage source based on an evaluation result of the ripple, and outputs the voltage adjustment information to the computer system, and
the computer system generates voltage adjustment signals for adjusting voltages of the first variable DC voltage source and the second variable DC voltage source based on the voltage adjustment information.

14. A charged particle beam device comprising:
the high-voltage source device according to claim 3;
a charged particle gun that is connected to an output terminal of the DC high-voltage source device; and
a charged particle beam device computer system that controls the charged particle beam device, wherein
the charged particle beam device computer system evaluates ripple of the DC high voltage by using an index value acquired from an inspection image formed by radiating a charged particle beam, generates switching timing adjustment information of the first switching circuit and the second switching circuit based on an evaluation result of the ripple, and outputs the switching timing adjustment information to the computer system, and
the computer system generates respective switching timing adjustment signals for adjusting switching timings of the first switching circuit and the second switching circuit based on the switching timing adjustment information.

15. The charged particle beam device according to claim 13, wherein
the index value is a resolution of the inspection image or an amount of beam swing synchronized with a switching frequency of the first switching circuit or the second switching circuit.

16. The charged particle beam device according to claim 13, wherein
at least a part of the DC high-voltage source device is mounted in either an insulating gas, an insulating oil, or an insulating resin material.

* * * * *